Nov. 3, 1931.  E. O. SEAVER  1,830,077
SEPARABLE FASTENER
Filed March 4, 1930  2 Sheets-Sheet 1
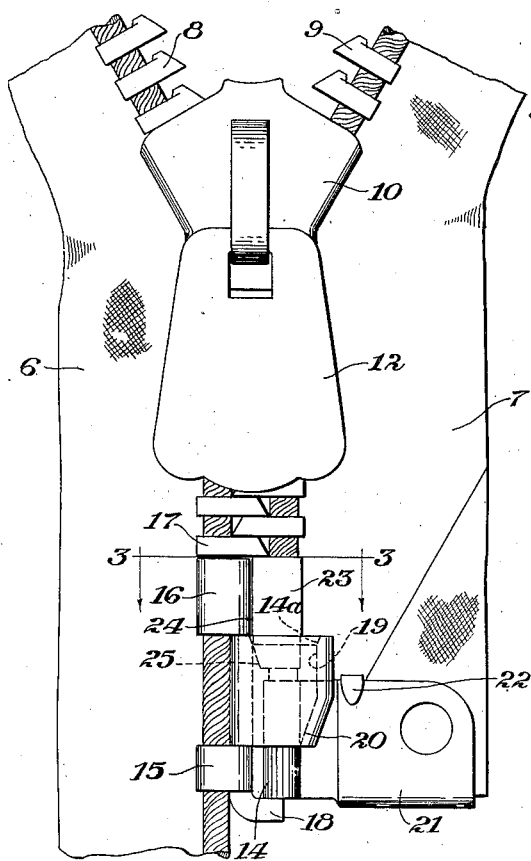
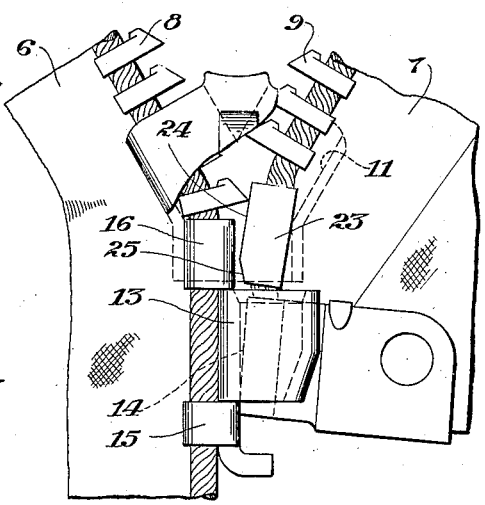
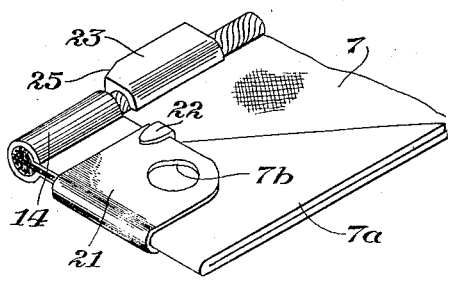
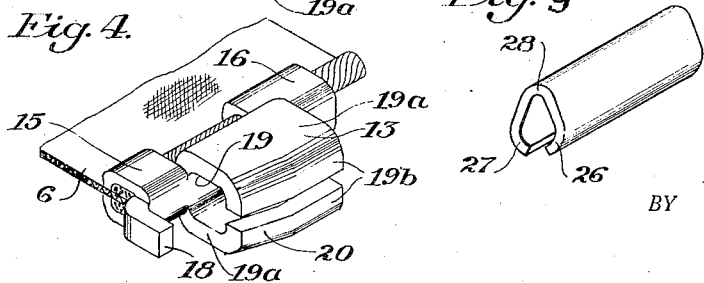
INVENTOR.
Elliot O. Seaver.
BY R. S. Kelley
ATTORNEY.

Nov. 3, 1931.  E. O. SEAVER  1,830,077
SEPARABLE FASTENER
Filed March 4, 1930  2 Sheets-Sheet 2

INVENTOR.
Elliot O. Seaver.
BY R. S. Kelley
ATTORNEY.

Patented Nov. 3, 1931

1,830,077

UNITED STATES PATENT OFFICE

ELLIOT O. SEAVER, OF MEADVILLE, PENNSYLVANIA, ASSIGNOR TO HOOKLESS FASTENER COMPANY, A CORPORATION OF PENNSYLVANIA

SEPARABLE FASTENER

Application filed March 4, 1930, Serial No. 432,999, and in Canada January 15, 1929.

My invention relates to separable interlocking fasteners of the type adapted to be completely separated at both ends, and has for its general object to provide a fastener of this type embodying an improved separable end connecting device.

This application is a continuation in part of my application Serial No. 247,069, filed January 16, 1928.

While fasteners separable at both ends have been heretofore proposed and a number of patents issued which disclose various separable end connecting devices, difficulty has been met in applying these prior devices to practical conditions of use and also in designing the parts of such devices so that they can be economically made and attached to the fastener stringers with simple tools. This invention therefore aims to provide a simple, cheap and reliable separable end connecting device and thereby increase the field of utility of slide operated fasteners. The device of my invention also embodies a stop for the slider, so as to prevent removal of the slider from the fastener, and to position the slider properly for reengagement of the parts.

In one concrete form which my invention may assume, a socket member is attached to an end of one of the usual stringers of a slide fastener, and suitable means is provided on the other stringer to be received and held by such socket in a definite position. The socket member also preferably carries a suitable stop device which engages a part on the other stringer so as properly to aline the stringers longitudinally in order that the interlocking fastener elements may mesh in the proper order.

The invention also includes various features in the structural design and relation of the several parts, whereby the same may be made cheaply of sheet metal with simple tools and securely attached to the stringers while at the same time providing a foolproof rigid connection. One of these features is the tapering of the socket in the socket member to minimize the lost motion between the parts of the device while allowing easy threading of the other part of the connecting device into the socket. Another important feature resides in arranging the socket member substantially in abutting relation with the endmost interlocking member on its stringer and in locating a stiffener member on the opposite stringer in such position as to be overlapped by the projecting end of such endmost interlocking member to hold it securely interlocked with its adjacent fastener element. A still further feature resides in the construction of the stiffening member so as to provide means for engaging the endmost interlocking member on the opposite stringer to prevent movement of the slider in a closing direction under all circumstances except when the pin member has been inserted into the socket to its final connected position.

Other objects and advantages of my invention will more fully appear during the course of the following specification.

In the accompanying drawings, I have shown for purposes of illustration, one form of my invention embodied in a slide operated fastener of a well-known type. In these drawings:

Fig. 1 is a plan view of a slide fastener embodying my invention.

Fig. 2 is a similar view showing the pin of the end connecting device in partly inserted position.

Fig. 3 is a transverse sectional view on line 3—3 of Fig. 1.

Fig. 4 is a perspective view of the socket member of the end connecting device.

Fig. 5 is a perspective view of other cooperating parts of the end connecting device.

Fig. 9 shows a modified form of one part of the device.

Figure 6:
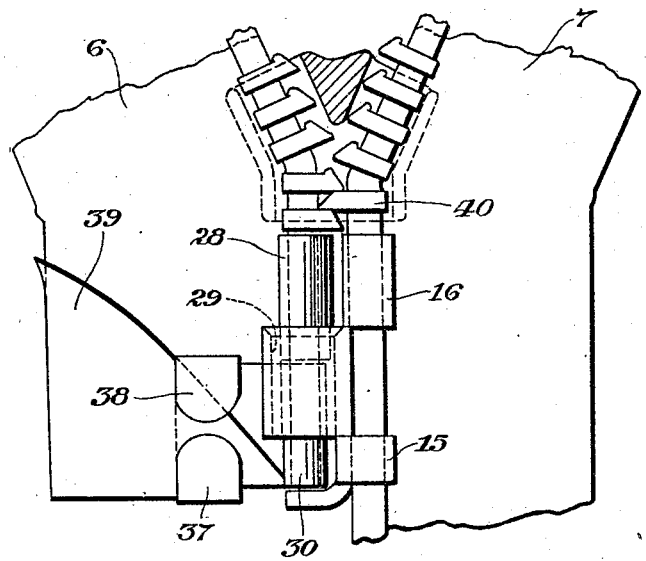
Fig. 6 is a view similar to Fig. 1 showing a modified construction.

While my invention is suitable for any of the known types of multiple operated fasteners, I have shown and illustrated it in connection with a slide fastener of the same general type as disclosed in the patent to Gideon Sundback No. 1,219,881, March 20, 1917. Such a fastener comprises a pair of fabric stringers 6 and 7 having attached to their adjacent corded edges, series of interlocking elements 8 and 9. A slider 10 having a Y-shaped channel 11 is operated along the fastener stringers by means of a pull member 12 to engage and disengage the interlocking members or fastener elements. As more commonly used, a permanent stop and stringer connection is placed at the lower end of the fastener, thus preventing complete separation of the fastener stringers. In many uses, however, such as in corsets, sweaters and coats, it is very desirable to separate completely one fastener stringer from another.

When the fastener is to be used in this manner it must be provided with a separable end connecting device which will not only hold the fastener stringers together very securely at one end, but which must also guide and position the fastener elements of one stringer with reference to those on the other stringer so that they will mesh properly and can be interlocked by the slider. The separable end connection illustrated in the drawings comprises a socket member 13 attached to the lower end of one stringer and a rigid pin member 14 at the lower end of the other stringer which is connected and disconnected from the socket member by endwise insertion and removal through the slider channel. In order to minimize the cost of production, the socket member is made out of sheet metal and is provided with clamping portions 15 and 16 for attaching it to the corded edge of the stringer, the portion 16 being disposed in substantially abutting relation with the endmost interlocking member 17. At the extreme lower end of the socket member a stop lug 18 is bent out laterally to limit the movement of the pin member 14. It will be observed that the socket 19 is narrowed down at its lower end by providing the inclined camming portions 20 which will prevent any large amount of lost motion between the parts, while at the same time providing a wide open end on the socket to guide the pin 14 into position. To further assist in guiding the pin 14 into the socket it is provided with a small beveled edge 14a. The socket 19 is formed by a pair of spaced parallel side plates 19a having inturned edges 19b at their free ends for receiving and holding the pin member 14. The pin member is also formed of sheet metal and comprises a tube-like section 14 around the corded edge and a flat metal plate 21 doubled over the end of the stringer and having an integral prong 22 extending through the fabric and clinched over the plate on the opposite side. The end of the fabric stringer 7 is doubled over as shown at 7a and rivet holes 7b are formed in the plate 21 to provide means for very securely attaching the pin member of the connecting device in the article to be fastened.

In order to stiffen the stringer above the pin member and to hold the device securely interlocked, a special stiffener member 23 of tube-like construction is clamped around the corded edge of the stringer. This member preferably has a front edge which is materially thickened as plainly appears in Figs. 1, 3 and 5. Also a substantially flat surface 24 may be formed on this member which is beveled off at its lower end as indicated at 25 to guide the tube-like member through the slider channel and into the socket 19. As shown in Fig. 1 when the device is connected and the fastener closed, the endmost interlocking member 17 overlaps and abuts the tube-like member 23 whereby the end interlocking member is held securely in interlocked relationship with the adjacent fastener element on the opposite stringer. Thus any tendency for the fastener to open up under severe strain at this point is absolutely eliminated by the rigid relation of the parts.

Another important function of the tube-like member 23 will now be noted. In Fig. 2 the device is shown being assembled and the pin member has not yet reached its final connected position. The flat surface 24 engages the end of the interlocking member 17 and when an attempt is made to pull up the slider, these members lock in the narrow end of the slider channel and prevent its movement. This is necessarily so because the combined width of the fastener element and tube-like stiffener member is materially greater than the width of the channel in the slider at its narrow end. The stiffening of the metal on the front side of member 23 makes it much more rigid and prevents the possibility of a slight deformation which would allow the slider to be pulled up.

In the modified construction illustrated in Figs. 6 to 9, the socket member has the clamping portions 15 and 16 and a socket 29 corresponding to socket 19 for reception of the pin member 30 which is of the same width throughout instead of being beveled at one as in Fig. 1. This socket is formed by side plates 31 and 32 with inturned outer edges 33 and 34 respectively, which engage the pin member to hold it in position. The modified pin member 35 is of substantially the same construction as the pin member 14 shown in Figs. 1 to 5 but may have simply a plate extension 36 on one side of the fabric stringer with tabs 37 and 38 clinched over the tape. The end of the tape is doubled over as in Fig. 5, the free end being indicated at 39. In other respects, the construction of the pin member and socket member is substantially the same as illustrated in Figs. 1 to 5. A modification of the tube-like stiffener member is illustrated in Fig. 9 wherein the member comprises a piece of sheet metal bent to form clamping portions 26 and 27 and an extended central portion 28 spaced from the stringer. This extended portion 28 serves the same purpose as the thickened outer edge of member 23. The member 28, by engagement with the lowest scoop 40, on the socket side of the fastener will resist closing movement of the slider until the pin member has been inserted almost to its final connected position.

Figure 10:
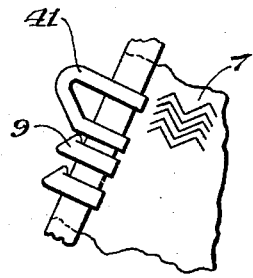
Fig. 10 is a detail view of an end of one of the stringers.
Figure 7:
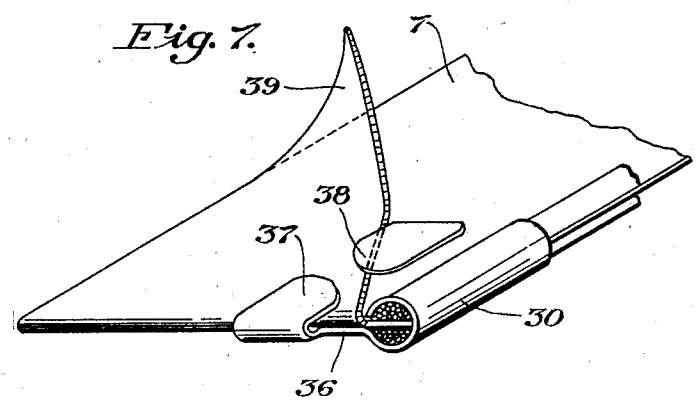
Fig. 7 is a perspective view of the pin member in Fig. 6.
Figure 8:
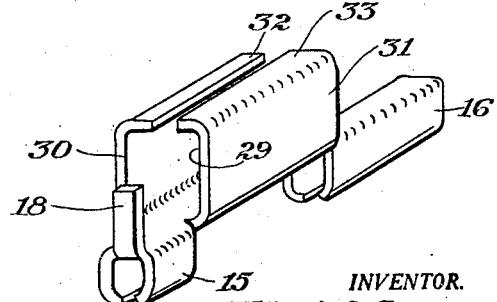
Fig. 8 is a perspective view of the socket member in Fig. 6.

In Fig. 10 the opposite end of one of the stringers is illustrated, such stringer having a stop member 41 attached thereto adjacent the endmost interlocking element, which prevents the slider from being pulled off the stringers.

In operation, the construction illustrated in Figs. 7 to 10, functions in somewhat the same manner as the form illustrated in Figs. 1 to 5.

It will be observed that my improved end connecting device for separable slide fasteners is practically foolproof, thus preventing the possibility of a damaged fastener when it is put into the hands of unskilled and careless operators. It will also be seen that the improved construction of the end connecting device will stand up under severe strain without allowing the fastener to be opened up.

While I have in this application specifically described one embodiment and a slight modification thereof which my invention may assume in practice, it will be understood that this embodiment and modification are merely for the purposes of illustration and description and that various other forms may be devised within the scope of my invention as defined in the appended claims.

What I claim as my invention is:

1. In a fastener adapted to be completely separated at both ends, a pair of stringers having opposed series of interlocking members, a slider movable along said stringers to engage and disengage said members, one stringer having a stiffened portion adjacent its lower end adapted with said stringer to be drawn through the slider, a socket on the other stringer to receive and hold said stiffened portion against lateral separation, and a projection attached to and arranged below said socket forming a stop for said stiffened portion of the stringer.

2. In a fastener adapted to be completely separated at both ends, a pair of stringers having opposed series of interlocking members, a slider movable along said stringers to engage and disengage said members, a plurality of stiffening members independently clamped to the edge of one stringer below the interlocking members thereof and adapted with said stringer to be drawn through the slider, and a socket member clamped to the edge of the other stringer to receive and limit the movement of said stiffening members.

3. In a fastener adapted to be completely separated at both ends, a pair of stringers having opposed series of interlocking members, a slider movable along said stringers to engage and disengage said members, a plurality of tubular stiffening members clamped to the lower end of one stringer and adapted with said stringer to be drawn through said slider, and a stop member clamped to the lower end of the other stringer adapted to retain the slider thereon and having an open ended socket to receive at least one of said tubular members to prevent lateral movement thereof, said stop member including a projection below said socket contacting with the lowermost tubular member to position said interlocking members for engagement in the proper sequence.

4. In a fastener adapted to be completely separated at both ends, a pair of stringers having opposed series of interlocking members, a slider movable along said stringers to engage and disengage said members, a tubular sheet metal member clamped to the lower edge of one stringer adapted to be drawn through said slider, and having a flat extension to stiffen said stringer adjacent the lower end thereof, and a sheet metal stop member clamped to the lower end of the other stringer having a portion adapted to abut against the slider to retain the slider thereon and to receive the tubular member of the first mentioned stringer and another portion contacting with said tubular member to position said interlocking members for engagement in the proper sequence.

5. In a fastener adapted to be completely separated at both ends, a pair of stringers having opposed series of interlocking members, a slider movable along said stringers to engage and disengage said members, and a separable end connection for said stringers comprising a connecting member adjacent the lower end of one stringer adapted to retain the slider thereon, the second stringer having its lower end folded over to prevent fraying, and a second connecting member attached to the lower end of said second stringer adapted to be connected to said first mentioned connecting member and having means for clamping the folded end of said second stringer and means engageable with said connecting member to position said interlocking members for engagement in the proper sequence, said second mentioned member being adapted with said second stringer to be drawn through said slider.

6. In a fastener adapted to be completely separated at both ends, a pair of stringers having opposed series of interlocking members, a slider movable along said stringers to engage and disengage said members, one stringer having its lower end folded over to prevent fraying, separable connecting members adjacent the lower ends of said stringers to position said interlocking members for engagement in the proper sequence, the connecting member on the second stringer being shaped to retain the slider thereon, and the connecting member on the first mentioned stringer being shaped to be drawn through said slider and having a bent portion clamping the fold of said stringer and a second bent portion piercing the stringer and clamping another part of said folded end.

7. In a fastener adapted to be completely separated at both ends, a pair of stringers having opposed series of interlocking members attached thereto, a slider movable along said stringers to control engagement of said members, and a separable end connection at one end of said stringers comprising a socket member attached to one stringer having a pair of side plates projecting therefrom, spaced apart at their free ends, and having means for holding a pin against lateral separation and a metal pin member on the other stringer to be received and held in said socket.

8. In a fastener adapted to be completely separated at both ends, a pair of stringers having opposed series of interlocking members attached thereto, a slider movable along said stringers to control engagement of said members, and a separable end connection comprising a socket member having a socket adjacent its central portion and open at its upper end, and clamping means at opposite ends of said member and positioned wholly beyond the longitudinal limits of said socket for holding it on one stringer, and means carried by the other stringer to be received and held by said socket.

9. In a fastener adapted to be completely separated at both ends, a pair of stringers having opposed series of interlocking members attached thereto, a slider movable along said stringers to control engagement of said members, and a separable end connection comprising a socket member carried by one stringer and a plurality of tube-like members carried by the other stringer, said socket member receiving and holding portions of each of said members when the device is connected.

10. In a fastener adapted to be completely separated at both ends, a pair of stringers having opposed series of interlocking members attached thereto, a slider movable along said stringers to control engagement of said members, and a separable end connection comprising a socket member carried by one stringer, a tube-like member clamped to the edge of the other stringer for engagement with said socket, and a plate for stiffening and reinforcing the stringer adjacent the lower end of said tube-like member.

11. In a fastener adapted to be completely separated at both ends, a pair of stringers having opposed series of interlocking members attached thereto, a slider movable along said stringers to control engagement of said members, and a separable end connection comprising a socket member carried by one stringer having side plates projecting therefrom, a metal pin member adjacent the end of the other stringer for insertion into the socket formed by said side plates, and a metal stiffening member clamped around the edge of said last mentioned stringer above the pin-like member, the outer edge of said stiffening member being spaced from the stringer more than the thickness of the clamping portions of such member.

12. In a slide fastener adapted to be completely separated at both ends, a pair of stringers having opposed series of interlocking members, a slider movable along the stringers to engage and disengage said members, and a separable end connection at the ends of said series of members comprising a socket member on one stringer, a rigid pin member on the other stringer for insertion through the channel of said slider and into said socket, and a member on the stringer carrying said pin for engaging the endmost interlocking member on the opposite stringer positively to prevent movement of the slider to close the interlocking members except when said pin member has been inserted to the final connected position.

13. In a slide fastener adapted to be completely separated at both ends, a pair of stringers having opposed series of interlocking members, a slider movable along the stringers to engage and disengage said members, and a separable end connection at the ends of said series of members comprising a socket member on one stringer, a rigid pin member on the other stringer for insertion through the channel of said slider and into said socket, and a tube-like member on the stringer carrying said pin member adapted to engage the endmost interlocking member on the opposite stringer and prevent movement of the slider to close the fastener until said pin member has been inserted to the final connected position, the combined width of an interlocking member and said tube-like member being substantially greater than the width of the slider channel at its narrow end.

14. In a slide fastener adapted to be completely separated at both ends, a pair of stringers having opposed series of interlocking members, a slider movable along the stringers to engage and disengage said members, and a separable end connection at the ends of said series of members comprising a socket member on one stringer, said socket member being disposed in substantially abutting relation to the endmost interlocking member on its stringer, and a tube-like member on the other stringer for insertion through the channel of said slider into connected engagement with said socket member, said endmost interlocking member overlapping and abutting said tube-like member.

15. In a slide fastener adapted to be completely separated at both ends, a pair of stringers having opposed series of interlocking members, a slider movable along the stringers to engage and disengage said members, and a separable end connection at the ends of said series of members comprising a socket member on one stringer, said socket member being narrower at its lower end than at the upper end and open at its upper end, and a pin member on the other stringer for insertion through the channel of said slider and into said socket from the upper end.

16. In a slide fastener adapted to be completely separated at both ends, a pair of stringers having opposed series of interlocking members, a slider movable along the stringers to engage and disengage said members, and a separable end connection at the ends of said series of members comprising a socket member on one stringer, and a pin member on the other stringer for insertion through the channel of the slider and into said socket, and camming means on said socket for wedging said pin towards a wall thereof during insertion of said pin.

17. In a slide fastener adapted to be completely separated at both ends, a pair of stringers having opposed series of interlocking members, a slider movable along the stringers to engage and disengage said members, and a combined separable end connection and slider stop at the ends of said series of members comprising a socket member on one stringer carrying a stop for the slider, a rigid pin member on the other stringer for insertion through the channel of said slider and through said socket, and a stiffener member on the latter stringer above said pin member, said stiffener member having a substantially flat outer surface for engaging the endmost interlocking member on the opposite stringer to prevent movement of the slider to close the fastener until said pin member has been inserted to its final connected position.

18. In a slide fastener adapted to be completely separated at both ends, a pair of stringers having opposed series of interlocking members, a slider movable along the stringers to engage and disengage said members, and a combined separable end connection and slider stop at the ends of said series of members comprising a socket member on one stringer carrying a stop for the slider, a pin member on the other stringer for insertion through the channel of said slider and through said socket, and a stiffener member on the latter stringer above said pin member, said stiffener member having a beveled lower corner to enable it to facilitate threading through the slider and into said socket.

19. In a fastener adapted to be completely separated at both ends, a pair of stringers having opposed series of interlocking members attached thereto along adjacent edges, a slider movable along said stringers to control engagement of said members, and a separable end connection for said stringers comprising a socket member on one stringer and a pin member on the other stringer engageable with said socket member, said socket member comprising a flat piece of metal having opposed central portions cut away and bent over into parallelism to form a socket between them for reception of said pin member, and other portions cut away and bent in the opposite direction toward each other to form clamping jaws for securing said member to the stringer.

20. In a slide fastener adapted to be completely separated at both ends, a pair of stringers having opposed series of interlocking members, a slider movable along said stringers to engage and disengage said interlocking members, and a separable end connection at the ends of said series of members comprising a socket member attached to one stringer adapted to receive and hold a tube-like member, a tube-like member on the other stringer adapted to be inserted through the channel of said slider and into connected engagement with said socket, the combined width of the lowermost interlocking member on the stringer carrying said socket member and the projecting portion of said tube-like member being substantially greater than the width of the slider channel at its narrow end, whereby said tube-like member abuts said lowermost interlocking member to prevent movement of the slider to close the fastener until said tube-like member has been inserted into final connected position.

Signed at Meadville, in the county of Crawford, and State of Pennsylvania, this 3rd day of March A. D. 1930.

ELLIOT O. SEAVER.

DISCLAIMER 1,830,077.—*Elliot O. Seaver*, Meadville, Pa. SEPARABLE FASTENER. Patent dated November 3, 1931. Disclaimer filed June 16, 1934, by the assignee, *Hookless Fastener Company*.

Disclaims, from the scope of the said Letters Patent, claims 1 and 5 in toto.

[*Official Gazette July 10, 1934.*]